(12) United States Patent  
Chopra et al.

(10) Patent No.: US 9,699,079 B2  
(45) Date of Patent: Jul. 4, 2017

(54) STREAMING BRIDGE DESIGN WITH HOST INTERFACES AND NETWORK ON CHIP (NOC) LAYERS

(71) Applicant: NETSPEED SYSTEMS, San Jose, CA (US)

(72) Inventors: Rajesh Chopra, San Jose, CA (US); Sailesh Kumar, San Jose, CA (US)

(73) Assignee: NETSPEED SYSTEMS, San Jose, CA (US)

( * ) Notice: Subject to any disclaimer, the term of this patent is extended or adjusted under 35 U.S.C. 154(b) by 425 days.

(21) Appl. No.: 14/144,258

(22) Filed: Dec. 30, 2013

(65) Prior Publication Data

US 2015/0188847 A1 Jul. 2, 2015

(51) Int. Cl.
*H04L 12/947* (2013.01)
*H04L 12/741* (2013.01)
(Continued)

(52) U.S. Cl.
CPC .............. *H04L 45/74* (2013.01); *H04L 45/10* (2013.01); *H04L 45/306* (2013.01)

(58) Field of Classification Search
CPC ....... H04L 45/74; H04L 45/10; H04L 45/306; H04L 49/70; H04L 49/25
(Continued)

(56) References Cited

U.S. PATENT DOCUMENTS

| | | |
|---|---|---|
| 5,432,785 A | 7/1995 | Ahmed et al. |
| 5,764,740 A | 6/1998 | Holender |

(Continued)

FOREIGN PATENT DOCUMENTS

| | | |
|---|---|---|
| CN | 103684961 A | 3/2014 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Charles C Jiang
*Assistant Examiner* — Wali Butt
(74) *Attorney, Agent, or Firm* — Procopio, Cory, Hargreaves & Savitch LLP

(57) ABSTRACT

Systems and methods described herein are directed to streaming bridge design implementations that help interconnect and transfer transaction packets between multiple source and destination host interfaces through a Network on Chip (NoC) interconnect, which includes a plurality of NoC router layers and virtual channels (VCs) connecting the router layers. Implementations are configured to support a variety of different traffic profiles, each having a different set of traffic flows. Streaming bridge design implementation can divide streaming bridge into a streaming TX bridge and a streaming RX bridge, wherein TX bridge is operatively coupled with host TX interfaces and RX bridge is operatively coupled with host RX interfaces, and where TX bridge forwards transaction packets from host TX interfaces to different router layers/VCs of NoC, and RX bridge, on the other hand, receives packets from NoC router layers/VCs and transmits the packets to host RX interfaces based on Quality of Service.

20 Claims, 16 Drawing Sheets

(51) Int. Cl.
*H04L 12/725* (2013.01)
*H04L 12/751* (2013.01)

(58) Field of Classification Search
USPC ............... 370/230, 392, 400, 401; 718/100; 725/93; 726/28
See application file for complete search history.

(56) References Cited

U.S. PATENT DOCUMENTS

| | | | |
|---|---|---|---|
| 5,991,308 | A | 11/1999 | Fuhrmann et al. |
| 6,003,029 | A | 12/1999 | Agrawal et al. |
| 6,249,902 | B1 | 6/2001 | Igusa et al. |
| 6,415,282 | B1 | 7/2002 | Mukherjea et al. |
| 6,925,627 | B1 | 8/2005 | Longway et al. |
| 7,065,730 | B2 | 6/2006 | Alpert et al. |
| 7,318,214 | B1 | 1/2008 | Prasad et al. |
| 7,590,959 | B2 | 9/2009 | Tanaka |
| 7,725,859 | B1 | 5/2010 | Lenahan et al. |
| 7,808,968 | B1 | 10/2010 | Kalmanek, Jr. et al. |
| 7,917,885 | B2 | 3/2011 | Becker |
| 8,050,256 | B1 | 11/2011 | Bao et al. |
| 8,059,551 | B2 | 11/2011 | Milliken |
| 8,099,757 | B2 | 1/2012 | Riedl et al. |
| 8,136,071 | B2 | 3/2012 | Solomon |
| 8,281,297 | B2 | 10/2012 | Dasu et al. |
| 8,312,402 | B1 | 11/2012 | Okhmatovski et al. |
| 8,448,102 | B2 | 5/2013 | Kornachuk et al. |
| 8,492,886 | B2 | 7/2013 | Or-Bach et al. |
| 8,541,819 | B1 | 9/2013 | Or-Bach et al. |
| 8,543,964 | B2 | 9/2013 | Ge et al. |
| 8,601,423 | B1 | 12/2013 | Philip et al. |
| 8,635,577 | B2 | 1/2014 | Kazda et al. |
| 8,667,439 | B1 | 3/2014 | Kumar et al. |
| 8,717,875 | B2 | 5/2014 | Bejerano et al. |
| 2002/0071392 | A1 | 6/2002 | Grover et al. |
| 2002/0073380 | A1 | 6/2002 | Cooke et al. |
| 2002/0095430 | A1 | 7/2002 | Egilsson et al. |
| 2004/0216072 | A1 | 10/2004 | Alpert et al. |
| 2005/0147081 | A1 | 7/2005 | Acharya et al. |
| 2006/0161875 | A1 | 7/2006 | Rhee |
| 2007/0118320 | A1 | 5/2007 | Luo et al. |
| 2007/0244676 | A1 | 10/2007 | Shang et al. |
| 2007/0256044 | A1 | 11/2007 | Coryer et al. |
| 2007/0267680 | A1 | 11/2007 | Uchino et al. |
| 2008/0072182 | A1 | 3/2008 | He et al. |
| 2008/0120129 | A1 | 5/2008 | Seubert et al. |
| 2009/0070726 | A1 | 3/2009 | Mehrotra et al. |
| 2009/0268677 | A1 | 10/2009 | Chou et al. |
| 2009/0313592 | A1 | 12/2009 | Murali et al. |
| 2010/0040162 | A1 | 2/2010 | Suehiro |
| 2011/0035523 | A1 | 2/2011 | Feero et al. |
| 2011/0060831 | A1 | 3/2011 | Ishii et al. |
| 2011/0072407 | A1 | 3/2011 | Keinert et al. |
| 2011/0154282 | A1 | 6/2011 | Chang et al. |
| 2011/0191774 | A1* | 8/2011 | Hsu ................... G06F 17/50 718/100 |
| 2011/0276937 | A1 | 11/2011 | Waller |
| 2012/0022841 | A1 | 1/2012 | Appleyard |
| 2012/0023473 | A1 | 1/2012 | Brown et al. |
| 2012/0026917 | A1 | 2/2012 | Guo et al. |
| 2012/0110541 | A1 | 5/2012 | Ge et al. |
| 2012/0155250 | A1 | 6/2012 | Carney et al. |
| 2013/0051397 | A1* | 2/2013 | Guo ................... H04L 45/00 370/400 |
| 2013/0080073 | A1 | 3/2013 | de Corral |
| 2013/0100803 | A1* | 4/2013 | Menchaca .......... H04L 47/2475 370/230 |
| 2013/0103369 | A1 | 4/2013 | Huynh et al. |
| 2013/0151215 | A1 | 6/2013 | Mustapha |
| 2013/0159944 | A1 | 6/2013 | Uno et al. |
| 2013/0174113 | A1 | 7/2013 | Lecler et al. |
| 2013/0207801 | A1 | 8/2013 | Barnes |
| 2013/0219148 | A1 | 8/2013 | Chen et al. |
| 2013/0263068 | A1 | 10/2013 | Cho et al. |
| 2013/0326458 | A1 | 12/2013 | Kazda et al. |
| 2014/0068132 | A1 | 3/2014 | Philip et al. |
| 2014/0092740 | A1 | 4/2014 | Wang et al. |
| 2014/0098683 | A1 | 4/2014 | Kumar et al. |
| 2014/0115218 | A1 | 4/2014 | Philip et al. |
| 2014/0115298 | A1 | 4/2014 | Philip et al. |
| 2014/0328343 | A1* | 11/2014 | Kapadia ................ H04L 45/741 370/392 |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W, et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

\* cited by examiner

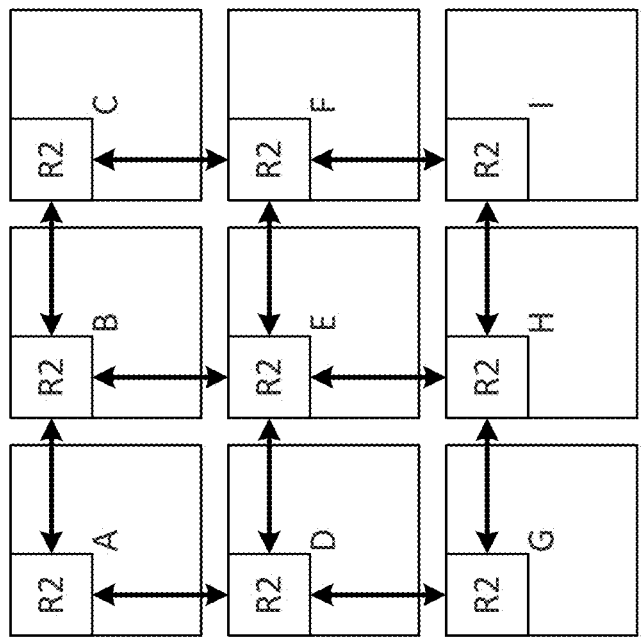
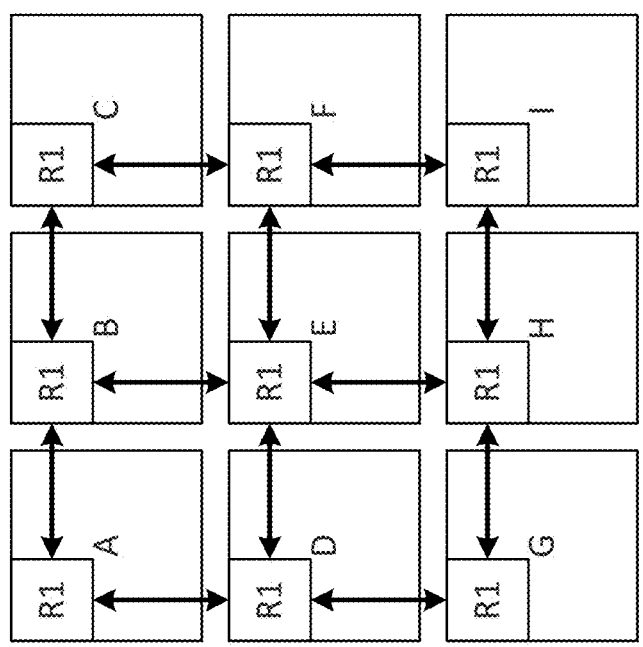
FIG. 2(a)

| Signal Name | Dir | Description |
|---|---|---|
| Host port egress interface * to NoC Layers | | |
| Source id | OUT | Destination host port id for this transaction |
| Destination id | OUT | Destination host port id for this transaction |
| Interface id | OUT | Destination host port's interface id for this transaction |
| Data beat valid | OUT | data valid |
| Start of transaction | OUT | start of packet |
| End of transaction | OUT | end of packet |
| Quality of service attribute of the packet | OUT | QoS of the transaction |
| Data beat | OUT | data |
| Credit increment return | IN | credit increment feedback |
| Host port ingress interface * from NoC Layers | | |
| Data beat valid | IN | data valid |
| Start of transaction | IN | start of packet |
| End of transaction | IN | end of packet |
| Data beat | IN | data |
| Credit increment return | OUT | credit increment feedback |

FIG. 8

| Signal Name | Dir | Description |
| --- | --- | --- |
| Streaming bridge TX interface * to NoC Layers | | |
| Flit valid | OUT | Flit valid for individual VCs |
| Data flit | OUT | Data |
| Routing info | OUT | Routing info |
| Start of transaction | OUT | start of packet |
| End of transaction | OUT | end of packet |
| Type of flit | OUT | type of packet |
| Cell valid | OUT | Number of cells valid |
| Credit increment return | IN | credit increment feedback |
| Streaming bridge TX interface * from NoC Layers | | |
| Flit valid | IN | Flit valid for individual VCs |
| Data flit | IN | Data |
| Routing info | IN | Routing info |
| Start of transaction | IN | start of packet |
| End of transaction | IN | end of packet |
| Type of flit | IN | type of packet |
| Cell valid | IN | Number of cells valid |
| Credit increment return | OUT | credit increment feedback |

FIG. 9

STREAMING BRIDGE DESIGN WITH HOST INTERFACES AND NETWORK ON CHIP (NOC) LAYERS

BACKGROUND

Technical Field

Methods and example implementations described herein are directed to a streaming bridge design, and more specifically, to a bridge design that is operatively coupled with multiple System-on-Chip (SoC) host interfaces and Network on Chip (NoC) Layers.

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination node over multiple intermediate nodes and physical links. The destination node then ejects the message and provides the message to the destination. For the remainder of this application, the terms 'components', 'blocks', 'hosts' or 'cores' will be used interchangeably to refer to the various system components that are interconnected using a NoC. Terms 'routers' and 'nodes' will also be used interchangeably. Without loss of generalization, the system with multiple interconnected components will itself be referred to as a 'multi-core system'.

There are several protocols by which components can connect to a network. Several industry standards are in existences such as AXI, PCI, etc. In addition, several internal protocols have been developed for communication between components. In a complex system-on-chip, there are close to a hundred components all connected to the same network by which they communicate with memory. These components have evolved through different periods of time and through different architectural and performance preferences, due to which they chose to adopt different interface protocols. Components that expect to connect to each other over a NoC must convert now their communication into a language that is understood by each intended destination.

Packets are message transport units for intercommunication between various components. A NoC provides maximum benefit to a system when requests and responses are packetized. The use of packets allows a reduction in hardware cost so that no dedicated connections are required between components. Existing connections can be time shared for packets from different sources going to different destinations. If a section of the NoC is compromised, packets can be automatically re-routed to provide a graceful degradation of the system instead of a deadlock. Hence, packetizing and bridging the chosen component protocol to a NoC provides a good interconnect solution.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 1(a) pictorially illustrates an example of XY routing in a two dimensional mesh. More specifically, FIG. 1(a) illustrates XY routing from node '34' to node '00'. In the example of FIG. 1(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels.

A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there may exist multiple route paths of equal length or number of hops between any pair of source and destination nodes. For example, in FIG. 1(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 2(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 2(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication which thereby reduces the global average latency, as well as reduce the number of router nodes and links over which the higher bandwidth of this communication must be provisioned.

Moving two hosts closer together may make certain other hosts far apart since all hosts must fit into the 2D planar NoC topology without overlapping with each other. Thus, various tradeoffs must be made and the hosts must be placed after examining the pair-wise bandwidth and latency requirements between all hosts so that certain global cost and performance metrics is optimized. The cost and performance metrics can be, for example, average structural latency between all communicating hosts in number of router hops, or sum of bandwidth between all pair of hosts and the distance between them in number of hops, or some combination of these two. This optimization problem is known to be NP-hard and heuristic based approaches are often used. The hosts in a system may vary in shape and sizes with respect to each other, which puts additional complexity in placing them in a 2D planar NoC topology, packing them optimally while leaving little whitespaces, and avoiding overlapping hosts.

There are several protocols by which components can connect to a network. As an example, there are several industry standards in existence such as Advanced eXtensible Interface (AXI), Peripheral Component Interconnect (PCI), and so on. In addition, several internal protocols have been developed for communication between components. In a complex system-on-chip, there are close to a hundred components all connected to the same network by which they communicate with memory. These components have evolved through different periods of time and through different architectural and performance preferences, due to which they chose to adopt different interface protocols. Components that expect to connect to each other over a NoC must convert now their communication into a language that is understood by each intended destination.

Packets are message transport units for intercommunication between various components. A NoC provides maximum benefit to a system when requests and responses are packetized. Use of packets allows a reduction in hardware cost so that no dedicated connections are required between components. Existing connections can be time shared for packets from different sources going to different destinations. If a section of the NoC is compromised, packets can be automatically re-routed to provide graceful degradation of the system instead of a deadlock. Hence, packetizing and bridging the chosen component protocol to a NoC provides a good interconnect solution.

Packetizing involves identifying a protocol that is flexible and compatible with many different protocols already in use. It should be able to work for all type of packets, reads, writes, barriers, posted or non-posted, ordered or out-of-order. It also should work for all packet lengths and sizes. Virtual channels inherent in the protocol should also be preserved over the NoC, or provided to the components as an enhancement.

To provide flexibility and adaptability, a bridging protocol employs wormhole routing, wherein the size of each flit is variable, and the number of flits are also variable. Additionally, the size of the flit, and hence the number of flits in the packet, may be different on the component size of the bridge than it is on the NoC side of the bridge.

FIG. 3 shows multiple fields used in a bridging protocol on an ingress side of a bridge, going from an originating component into the bridge. Such a bridge can be called an "originating bridge" or a "transmitting bridge". As illustrated, the head flit includes 1 bit indicating the start of packet (Start-of-Packet bit), an X-bit destination node identification field, a Y-bit destination interface identification field, and a Z-bit virtual channel identification field. These fields present in the head flit allow the originating bridge and the routers of the NoC to choose the way through which the packet needs to be sent to its destination. No data is present in the head flit. Data payload provided by the component begins from the second flit. Width of the data packet may be variable and decided beforehand. Length, or the number of flits in the data packet, may be variable and decided on-the-fly by the SoC component/host. SoC component signals a tail flit by setting the End-of-Packet bit. Validity of the payload of the packet may be indicated by a valid bit. It is possible that a SoC component does not provide data on each clock cycle. Each valid flit of the packet may only be sent by the component if a credit is available. Initial credits available to the SoC component may be set up based on FIFO depths within the originating bridge. A credit is consumed each time the component sends a valid flit. A credit is released by the bridge each time a valid flit is received and processed. Credits are accumulated by the component as they are received from the bridge.

The simplicity and flexibility of this protocol allows any number of fields to be sent as the data payload, as long as they are decoded correctly by the destination component. The protocol is lightweight and for each data or metadata flit, adds only three extra bits: Valid, Start-of-Packet and End-of-Packet. For example, for server systems that require strict integrity of data, a CRC or parity field may be created by the component and added to the payload. The destination component on receiving this packet may strip the packet into the respective fields and match CRC or parity accordingly.

FIG. 4 shows the fields used in the bridging protocol on the egress side of the bridge, going into the destination component. This bridge is referred to as the "destination bridge" or "receiving bridge". The data or metadata width of the destination bridge can be different from that of the originating bridge. Head flit can include 1 bit indicating the start of packet and the tail flit can include 1 bit indicating the end of packet. For a short packet of only 1 flit, both Start-of-Packet and End-of-Packet bits can be set at the same time. At the egress side of the bridge, all packet metadata such as destination node identification field, destination interface identification field and virtual channel identification fields are stripped away. All fields provided in the data payload by the originating component are preserved and presented to the destination component. At the destination component, each flit from the bridge to the component may be provided only in the presence of a credit. Initial credits within the bridge can be set up based on First in First Out (FIFO) depths within the destination SoC component. When a flit is sent to the destination component, a credit is consumed. As each flit is received and processed, the destination component releases a credit to the destination bridge. Bridges can also be configured to facilitate the conversion between different channel widths, such as converting flits for one channel into another flit for a channel with a different width.

Within a virtual channel, packets sent from an originating component A are received by a destination component B in the same order as they are sent. To preserve all traffic patterns as intended by the originating component, and to prevent deadlocks, the bridge and NoC may not do any reordering of packets.

Virtual channels are provided within a network to allow priority or isochronous packets to meet latency deadlines. To access a certain virtual channel, an originating component may choose a virtual channel and provide its information in the virtual channel identification field in the head flit of the packet. The originating bridge uses this information and uses a pre-decided routing table to arbitrate for this packet based on available credits, virtual channel priorities, and destination route. Virtual path from the source to the destination component can be maintained throughout the life of the packet within the NoC. Widths of the individual virtual channels are also flexible and may be programmed differently from each other as long as each width is less than the programmed width of the destination payload.

The destination bridge receives the packet with the virtual channel identification field intact, and then arbitrates the packet based on destination, virtual channel priorities, and destination component port. In this way, the virtual path and priority of a packet is maintained throughout the NoC, between the originating component and destination component.

The originating and destination bridges are flexible in terms of how they convert the packet on their egress sides. Each bridge may upsize and/or downsize the packet width to best suit the performance of the NoC. For instance, a protocol packet leaving the originating bridge and going further into the NoC may increase the size of the packet two-fold if the width of the NoC physical channel so allows, which as a result, reduces the latency seen within the NoC between origin and destination.

In the OSI (Open Systems Interconnection) model of computer networking, there are seven layers. Layer closest to the electrical interface is the Physical Layer, while the layer closest to software, the highest layer, is the Application Layer. Between the Physical Layer and the Application Layer, and in the same order, are the Data Link Layer, the Network Layer, the Transport Layer, the Session Layer and the Presentation Layer. The protocol described in this document sits between the Network and Transport Layers. FIG. 5 indicates the position of the NoC protocol. It is capable of converting any transaction in the layers below it, as well as a transaction from the Transport layer into the desired NoC packet protocol.

SUMMARY

The present application is directed to a network-on-chip (NoC) interconnect, which can connect various SoC components with each other using one or more streaming bridges, routers, and point to point links between the routers. Aspect of the present application further relates to a streaming bridge that supports an architecture, which can efficiently simplify traffic management by managing transmission of a message (including one or more transaction packets) from an ingress side to an egress side according to the traffic profiles in SoC. Furthermore, streaming bridge of the present disclosure allows a higher degree of configurability.

Aspects of the present application may include a plurality of system traffic profiles supported in a system on chip (SoC), where each system traffic profile includes a set of traffic flows, which indicate a Network on Chip (NoC) hardware configuration that supports a plurality of unidirectional or bi-directional fully configurable streaming bridges. Traffic profile of a SoC can include transactions between various components in the SoC and their properties such as e.g., Quality of Service (QoS), priority, bandwidth and latency requirements, transaction sizes, etc. Furthermore, the traffic profile information may be used to determine how various transactions may be routed in the NoC topology, and accordingly provision link capacities, virtual channels, and router nodes of the NoC. Accurate knowledge of the traffic profile can lead to an optimized NoC hardware with minimal over-provisioning in terms of link wires, virtual channel buffers and additional router nodes.

Aspects of the present application may also include a method, which involves designing a NoC that can support a variety of different component protocols. These protocols can each consists of different sets of data profiles of different data width and packet sizes. Aspects of the present application may further include a configurable streaming TX bridge that supports a plurality of host TX interfaces based on start-of-packet (SOP), end-of-packet (EOP), validity of packet, and credit information. Furthermore, the configurable streaming bridge can also support N number of router layers with various virtual channels with specific credit information along with the SOP, EOP, Data, Data valid.

Aspects of the present application may include a streaming TX bridge at the ingress side where a transaction packet is injected, and can be configured to support various QoS profiles including priority and weights, wherein weights can give information regarding the type of packet received (such as normal or barrier packets) and can be marked from SOP through all data beats till EOP. A streaming TX bridge may check the incoming signal against all the entries at the lookup table. Each entry of the lookup table may include a key of the incoming information that can be used for matching against addresses of incoming requests, along with other parameters. Such a key can be formed by concatenating one or more ingress signals such as destination interface, destination host port identifier, and QoS parameters. If the key match is found, the information continues to pass through the streaming TX bridge to the router layer with new remap address from the matching access table entry.

Aspects of the present application may further include a streaming RX bridge at the egress side where a transaction packet received from the NoC interconnect is processed at the streaming RX bridge, which in turn supports a plurality of host RX interfaces that correspond to SoC destination components Like the streaming TX bridge, the streaming RX bridge may be configured to support varied traffic profiles and protocols having different parameters including SOP, EOP, Data, Data Valid, and Credit information. Streaming RX bridge can also be configured to support multiple router layers with any number of virtual channels.

Aspects of the present application can further include an external optimization module that can compute mapping of a given traffic profile to the NoC and configure the NoC hardware by loading the computed mapping information; as part of the mapping process, performing load balancing between NoC layers by automatically assigning the transactions in the traffic profile to NoC layers, automatically determining the routes in the corresponding NoC layers and balancing load on various NoC channels based on the bandwidth requirements of the transactions, and in the process also utilizing the available NoC layers and virtual channels for deadlock avoidance and isolation properties of various transactions of the traffic profile.

Aspects of the present application include an integrated circuit (IC), which may contain a plurality of system interface protocols supported in a system on chip (SoC), wherein each of the plurality of system interface protocols include a set of traffic protocols, which are compatible with the proposed streaming bridge having TX and RX interfaces that correspond and support multiple corresponding host TX and RX interfaces across differing traffic profiles.

Aspects of the present application may include a computer readable storage medium storing instructions for executing a process. The instructions may involve, configuring a streaming TX bridge and a streaming RX bridge configured to support a plurality of system traffic profiles, wherein streaming TX bridge supports and is operatively coupled with a plurality of host TX interfaces and router layers, and the streaming RX bridge supports and is operatively coupled with a plurality of host RX interfaces and the router layers.

Aspects of the present application may include a system, which involves a host TX interface module having a plurality of SoC host TX interfaces and configured to process transaction packets from SoC hosts, a streaming TX bridge module configured to receive packets from the host TX interfaces and process the packets based on NoC interconnect protocol for onward transmission to the NoC router layers. The system may further include a streaming RX bridge module configured to receive packets from the NoC router layers, arbitrate the received packets, and process the packets for making them support multiple corresponding host RX interfaces. The system may further include a host RX interface module having a plurality of SoC host RX interfaces and configured to receive packets from the streaming RX bridge module.

The foregoing and other objects, features and advantages of application will be apparent and the following more particular descriptions of the example implementations of the application as illustrated in the accompanying drawings wherein like reference numbers generally represent like parts of example implementations of the application.

BRIEF DESCRIPTION OF THE DRAWINGS

FIG. 2(a) illustrates an example of a related art two layer NoC interconnect.

FIG. 8 illustrates example signals from host port interface to/from streaming bridge in accordance with an example implementation.

FIG. 9 illustrates example signals from streaming bridge to/from NoC routers layers in accordance with an example implementation.

DETAILED DESCRIPTION

Figure 1A:
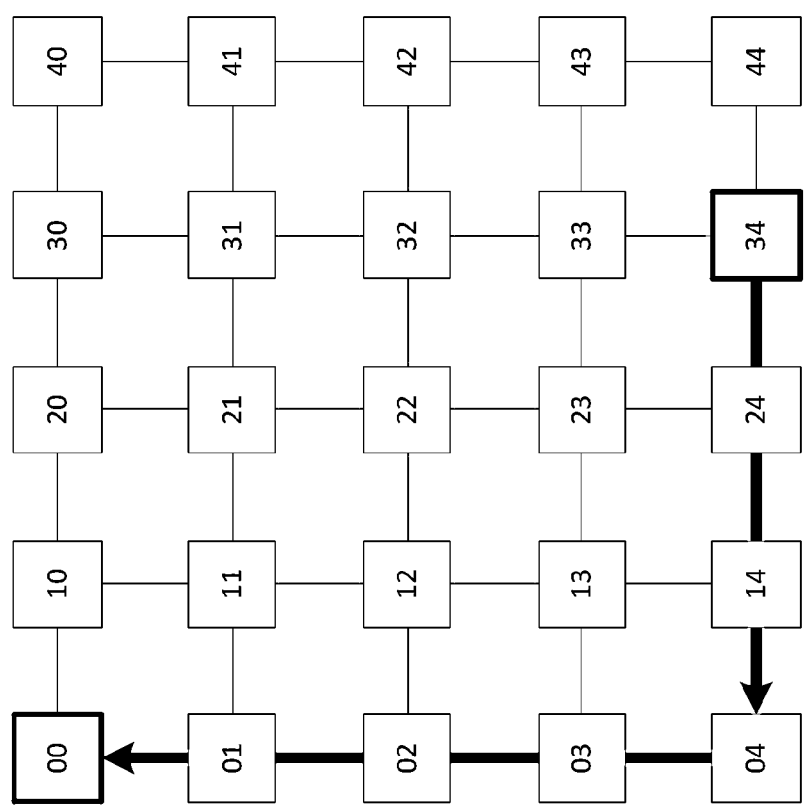
FIG. 1(a) illustrates an example of XY routing in a related art two dimensional mesh.
Figure 1B:
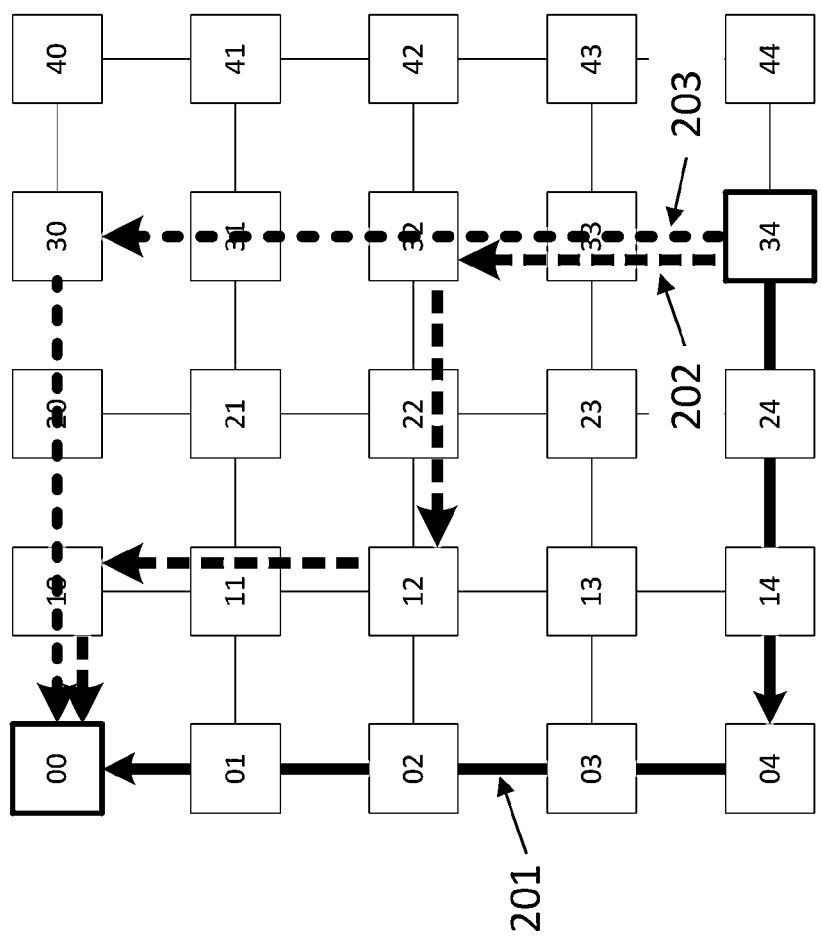
FIG. 1(b) illustrates three different routes between a source and destination nodes.
Figure 2B:
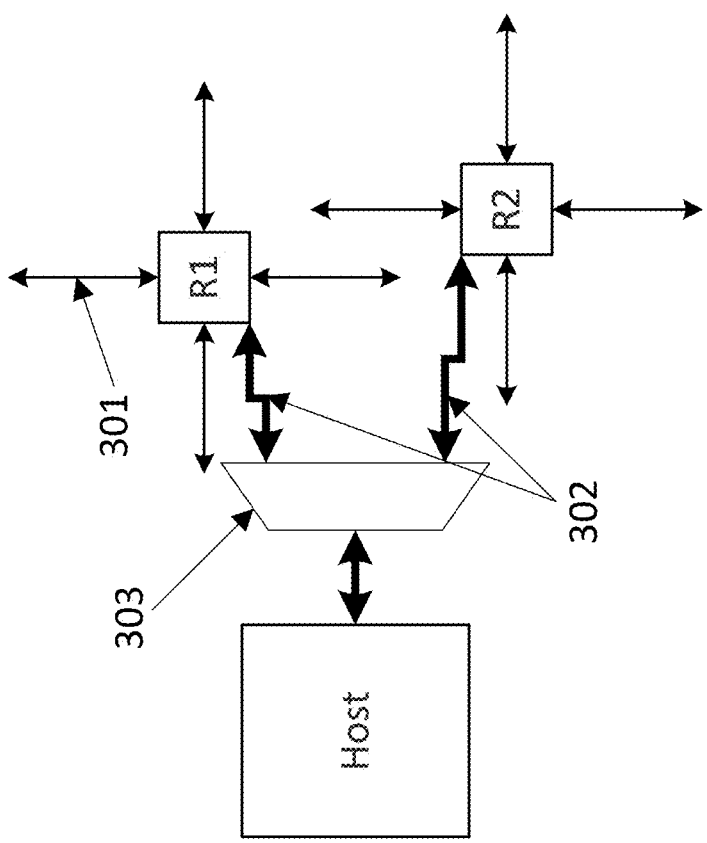
FIG. 2(b) illustrates the related art bridge logic between host and multiple NoC layers.
Figure 3:
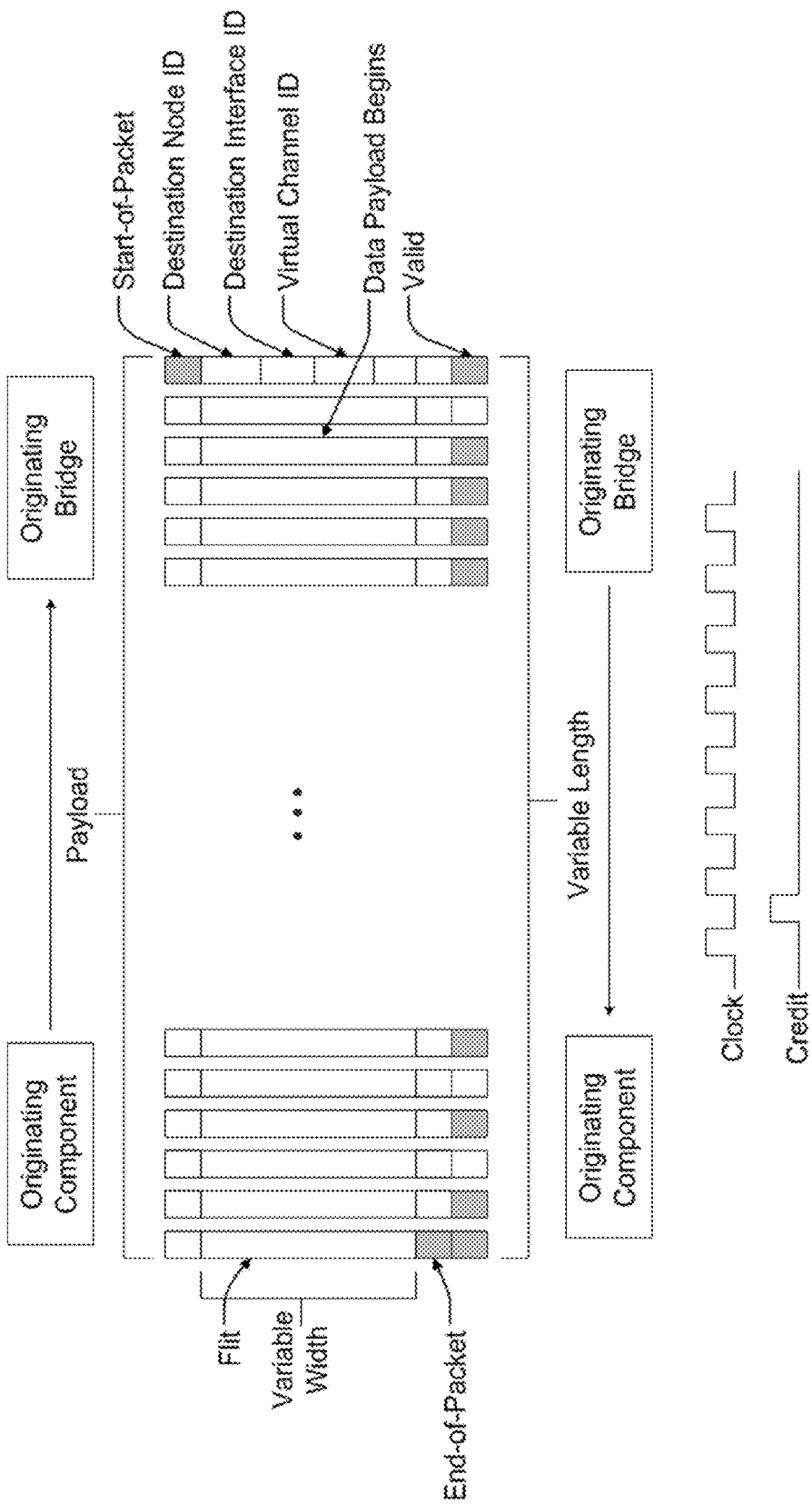
FIG. 3 illustrates the processing of a packet going from an originating component to an originating bridge for onward transmission to NoC interconnect.
Figure 4:
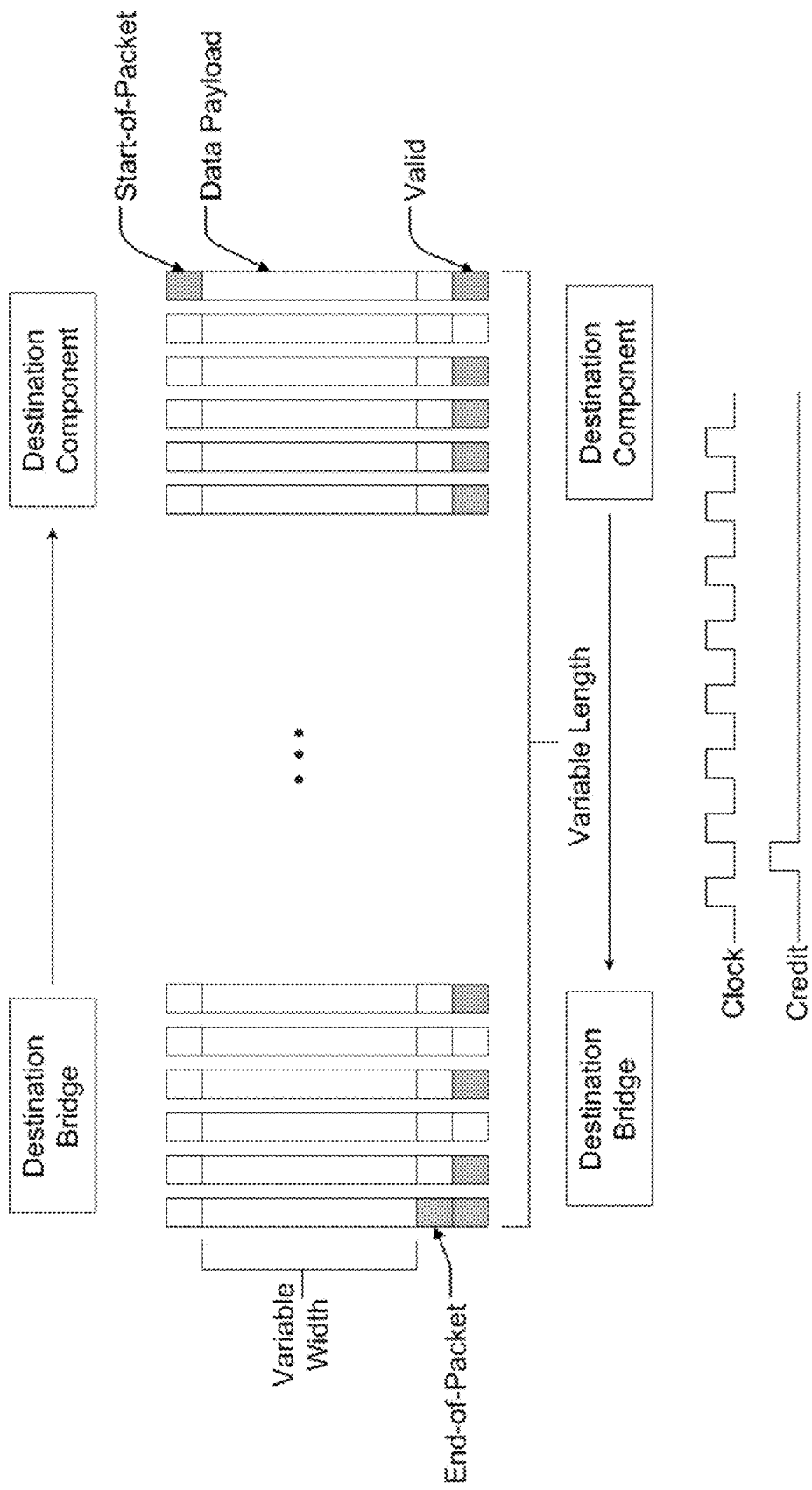
FIG. 4 illustrates the processing of a packet received into a destination component from a destination bridge.
Figure 5:
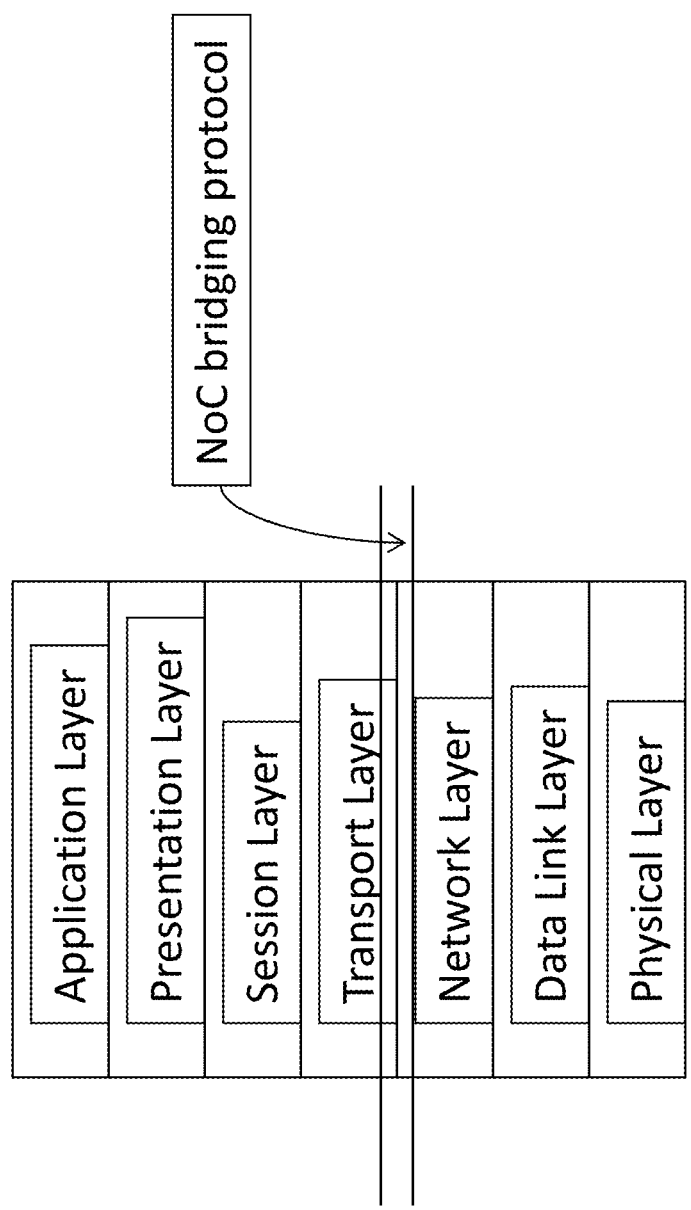
FIG. 5 illustrates the position of NoC protocol in the OSI model of computer networking.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

In an example implementation, a streaming NoC interconnect connects various components in a system on chip (SoC) with each other using a streaming bridge, multiple routers, and point-to-point links between the routers. Traffic profile of a SoC typically includes transactions between various components in the SoC and their properties (e.g., Quality of Service (QoS), priority, bandwidth and latency requirements, transaction sizes, etc.). The traffic profile information may be used to determine how various transactions will be routed in the NoC topology, and accordingly provision link capacities, virtual channels, and router nodes of the NoC. Accurate knowledge of the traffic profile can lead to an optimized NoC hardware with minimal overprovisioning in terms of link wires, virtual channel buffers, and additional router nodes. SoCs today are designed to run a number of different applications, resulting in a NoC traffic profile that may differ based on how and in what market segments the SoC is deployed, and what applications are supported. Supporting a variety of traffic profiles offers several challenges in the NoC design and optimization.

In another example implementation, streaming bridge of the present application provides a relatively simple interface to the host ports/interfaces and performs simple packetization of host port data into NoC packets. The streaming bridge can provide up to N unidirectional (TX or RX) or bi-directional (TX and RX) interfaces to the host ports/interfaces. Each interface can receive and/or transmit transactions of fixed number of data bits per cycle. The number of bits or widths of the outgoing and incoming interfaces may be individually configurable. Outgoing transaction forwarding properties such as source host port id, source interface id, destination host port id, destination host interface id, and Quality of Service (QoS) may be factored by the proposed streaming bridge to accordingly identify the NoC router layers and process the transaction messages before it reaches the destination SoC component.

Aspects of the present application can further include an external optimization module that can compute mapping of a given traffic profile to the NoC and configure the NoC hardware by loading the computed mapping information as part of the mapping process, performing load balancing between NoC layers by automatically assigning the transactions in the traffic profile to NoC layers, automatically determining the routes in the corresponding NoC layers, and balancing load on various NoC channels based on the bandwidth requirements of the transactions, and in the process also utilizing the available NoC layers and virtual channels for deadlock avoidance and isolation properties of various transactions of the traffic profile. External optimization module can provide external support for buffering of packets in external memory. External memory can be frequently used for storage of packets to achieve several objectives such as to provide intermediate storage when multiple stages of processing are to be performed within the system. Each stage can be operated on the packet and can be passed to the next stage or to provide deep elastic storage of many packets which may arrive from an injection interface at a higher rate than they can be sent on a transmit interface or to support the implementation of priority based scheduling of outbound packets that are waiting to be sent on a transmit interface.

Aspects of the present application include an integrated circuit (IC), which may contain a plurality of system interface protocols supported in a system on chip (SoC), wherein each of the plurality of system interface protocols includes a set of traffic protocols, determining a Network on Chip (NoC) hardware configuration that supports any component packet within the width determined by the NoC hardware configuration. Shims may be used to facilitate interaction between different protocols.

In one example implementation, messages carried by the NoC, alternatively referred to as NoC messages or packets or transactions or information or beat or flits hereinafter, are delineated by a start of message signal (SOM) and an end of message signal (EOM). It would be appreciated that SOM has also been interchangeably referred to as SOP (start-of-packet) in the instant application. Similarly, EOM has also been interchangeably referred to as EOP in the instant application. For communication over the NoC, a packet can be segmented into units called chunks (with a maximum chunk size) and each chunk may be encapsulated inside a NoC message for communication from the source host interfaces to the destination host interfaces through the streaming bridge over multiple router layers. Each host interface may also be associated with its own clock that can operate asynchronously from the NoC clock.

In one example implementation, streaming bridge of the present application can be designed to interconnect with a variety of networks, where the volume of data flow through the bridge can significantly vary. The ability to communicate and configure large amount of data, according to a wide variety of networking protocols, makes the streaming bridge form part of a highly efficient data processing engine.

Figure 6:
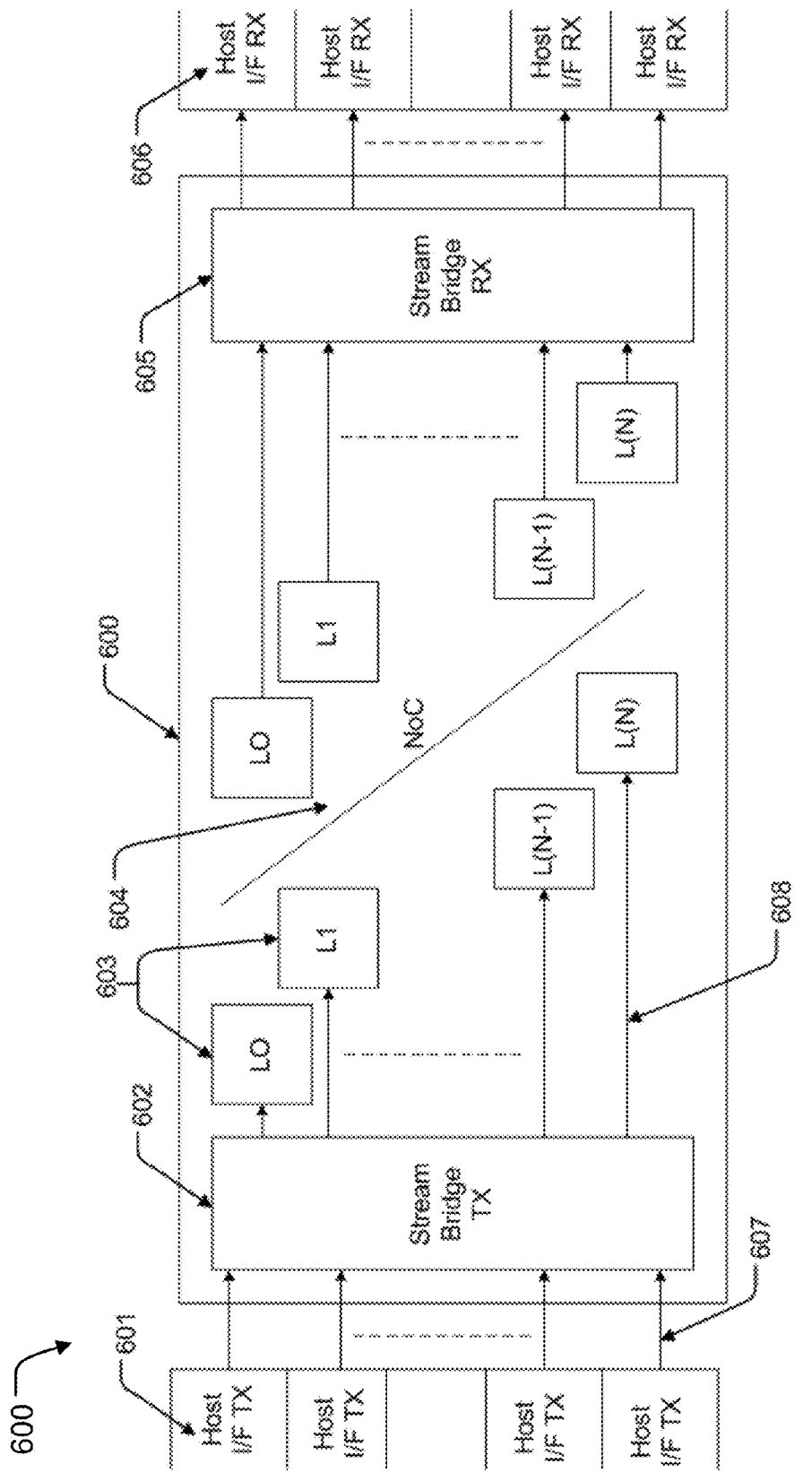
FIG. 6 illustrates the transmission (TX) and receiving (RX) sections of a streaming bridge in accordance with an example implementation.

FIG. 6 illustrates a section of streaming NoC 600 with N number of Host TX interfaces for a particular source host. In one example implementation, host TX 601 can interface with streaming TX bridge 602 on the ingress side and with NoC router layers 603 on the egress side. Source host TX 601 can send a message to destination host RX 606 through the streaming TX bridge 602 to the router layers 603, and further on to the streaming RX bridge 605. As illustrated, the streaming TX bridge 602 and the streaming RX bridge 605 sit between the host TX 601 and the host RX 606, wherein the streaming bridges help determine the NoC layer protocol, routing pattern, transmission properties, among other settings on NoC router layers to allow efficient processing and transmission of the packets. Streaming bridges described herein may be transparent to the hosts of the interconnected SOCs. In an example implementation, streaming bridge of the proposed architecture can transmit and receive data over multiple high speed serial transmit and receive channels, respectively, wherein the streaming TX bridge 602 receives packets at ingress side from the source host and can then perform arbitration and multiplexing on the received transmission packets based on packet attributes such as SOP, EOP, Data, Data Valid and Credit information thereof. Based on the above mentioned attributes and the virtual channel information, destination interface identifier, destination host identifier received from the transaction packets, the streaming TX bridge identifies the appropriate number of router layers 603 as shown in FIG. 6 as layers L0, L1, L(N-1), and L(N), which can deliver the received packets to the streaming RX Bridge 605, and which performs arbitration based on destination component interfaces, and identifiers related thereto.

In one example implementation, NoC router layers 603 can deliver packets received from the host TX 601 to the host RX 606 at the egress side. For egress signals, streaming TX bridge 602 can output data information for transmission over respective serial transmit channels. Streaming TX bridge 602 can also encode and serialize the received data and then can transmit the serialized encoded data over the respective serial transmit channels. In one example implementation, destination routers can interface with streaming RX bridge 605 on the ingress side and with the host RX 606 interfaces on the egress side. For ingress signals, streaming RX bridge can receive the serialized encoded data over respective channels and then de-serialize and decode the received data for output to the desired and appropriate host RX interfaces.

In one example implementation, arbitration and multiplexing may also be performed at the streaming RX bridge end, which, for execution, typically depend on the size of incoming packets, bandwidth requirement of traffic flow, among other traffic related parameters. For instance, an incoming packet P(N) corresponding to $N^{th}$ host interface of host TX 601 can be received by the streaming TX bridge 602 at the ingress side 607 and at the egress side 608, wherein the packet P(N) can then be converted to any defined/configurable size based on NoC interconnect/protocol and maintained throughout the NoC interconnect for delivery to the appropriate host RX interface.

Figure 7:
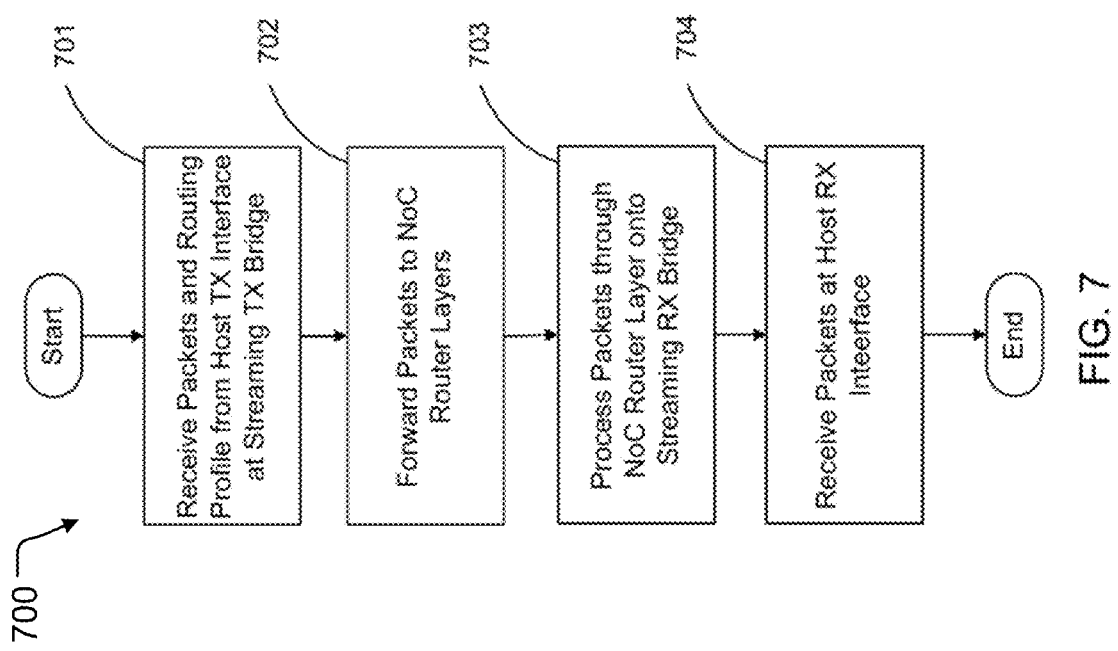
FIG. 7 illustrates a flow diagram showing flow of transaction messages between host TX/RX interfaces and streaming TX/RX bridge in accordance with an example implementation.

FIG. 7 illustrates a flow diagram 700 showing flow of transaction messages between host TX/RX interfaces and streaming TX/RX bridge in accordance with an example implementation. At 701, the streaming TX bridge receives one or more transaction packets from a plurality of host TX interfaces. Along with the packets, allied attributes and parameters such as SOP, EOP, destination interface identifier, destination interface identifier, virtual channel identifier, data validity flags, and credit information can also be received by the streaming TX bridge. At 702, the transaction packets are forwarded to one or more NoC router layers based on traffic parameters and information received from the source host TX. Streaming TX bridge may be configured to support any number of router layers with any number of virtual channels. Streaming TX bridge may also be configured to support a variety of QoS profiles with priority and weights that might be assigned or desired by the source/destination hosts.

At 703, packets received at the NoC router layers may be processed and passed onwards to the streaming RX bridge for onwards transmission. Processing of packets at this stage may include transmitting the packets along with a single or a combination of virtual channels mentioned by the source host interface from the NoC router layers to the streaming RX bridge. In one example implementation, NoC router layers can include a destination router layer, which can be the final layer in the NoC interconnect after which the packet is received by the streaming RX bridge. At 704, the packets received by the streaming RX bridge are transmitted to corresponding host RX interface(s). Streaming RX bridge may also be configured to support any number of host RX interfaces with SOP, EOP, payload/data, data validity indicators, and credit information. Streaming RX bridge can further be configured to support any number of router layers with any number of virtual channels. In another example implementation, streaming RX bridge can be configured to include single or multiple level of arbitration procedures, wherein one level of arbitration may occur between the VCs on a given layer, and another level of arbitration may occur between the winning VC's of different router layers.

FIG. 8 illustrates example signals at the host interface side of a streaming NoC bridge. In an example implementation, host TX interface provides a routing profile, which may include source interface ID, destination port ID, destination interface ID, and Quality of Service (QoS), along with a transaction message to a streaming bridge TX. The transaction packet/message may span across multiple clock cycles, where the data transmitted in each cycle of a transaction can be referred to as a beat. Beat may be qualified by using a valid (also known as data valid) bit. The first and last beats of a transaction can be marked with a SOP (start of packet) bit and an EOP (end of packet) flag respectively. Furthermore, beats of a transaction may use a credit based flow control.

In another example implementation, the streaming RX interface receives a message from the streaming bridge TX and then provides the message to an appropriate host RX interface, wherein the transaction may also span for multiple clock cycles and the data transmitted can be again in the form of beats and qualified by means of a data valid bit. The first and last beats of the transaction message may again be marked with a SOP (start of packet) bit and an EOP (end of packet) flag, helping the host RX interface to understand the length, size, among other properties of the message.

FIG. 9 illustrates example signals from streaming bridge to/from NoC routers layers in accordance with an example implementation. Streaming TX bridge provides the routing information for the packet (received from the host TX) to traverse through the NoC, wherein the routing information may be generated based on transaction forwarding properties such as the source host port id, source interface id, destination host port id, destination host interface id, and Quality of Service (QoS).

FIG. 9 further illustrates signals at the router layer side of a streaming NoC. In an example implementation, signal information from streaming TX bridge to NoC router layers may include data beat, flit valid, routing information, SOP, EOP, number of valid cells, type of flit, validity information of cell, credit information return, input credit, among other relevant information. Since there can be any number of virtual channels, a valid flit accounts for each virtual channel. Streaming NoC may also define a CELL_SIZE, which corresponds to size of a cell, wherein data beat/flit is composed of multiple CELL_SIZE. The number of valid cells in a beat/flit may also be transmitted/received from/to the router and/or router layers. In addition to sending information to NoC router layers, streaming bridges can also be configured to receive flit valid information, payload data of flits, routing information, start of transaction indicators, end of transaction indicators, type of flit, and credit increment return information. Any other information transacted between the streaming NoC bridge(s) and the router layers/VCs is completely within the scope of the present application.

Figure 10:
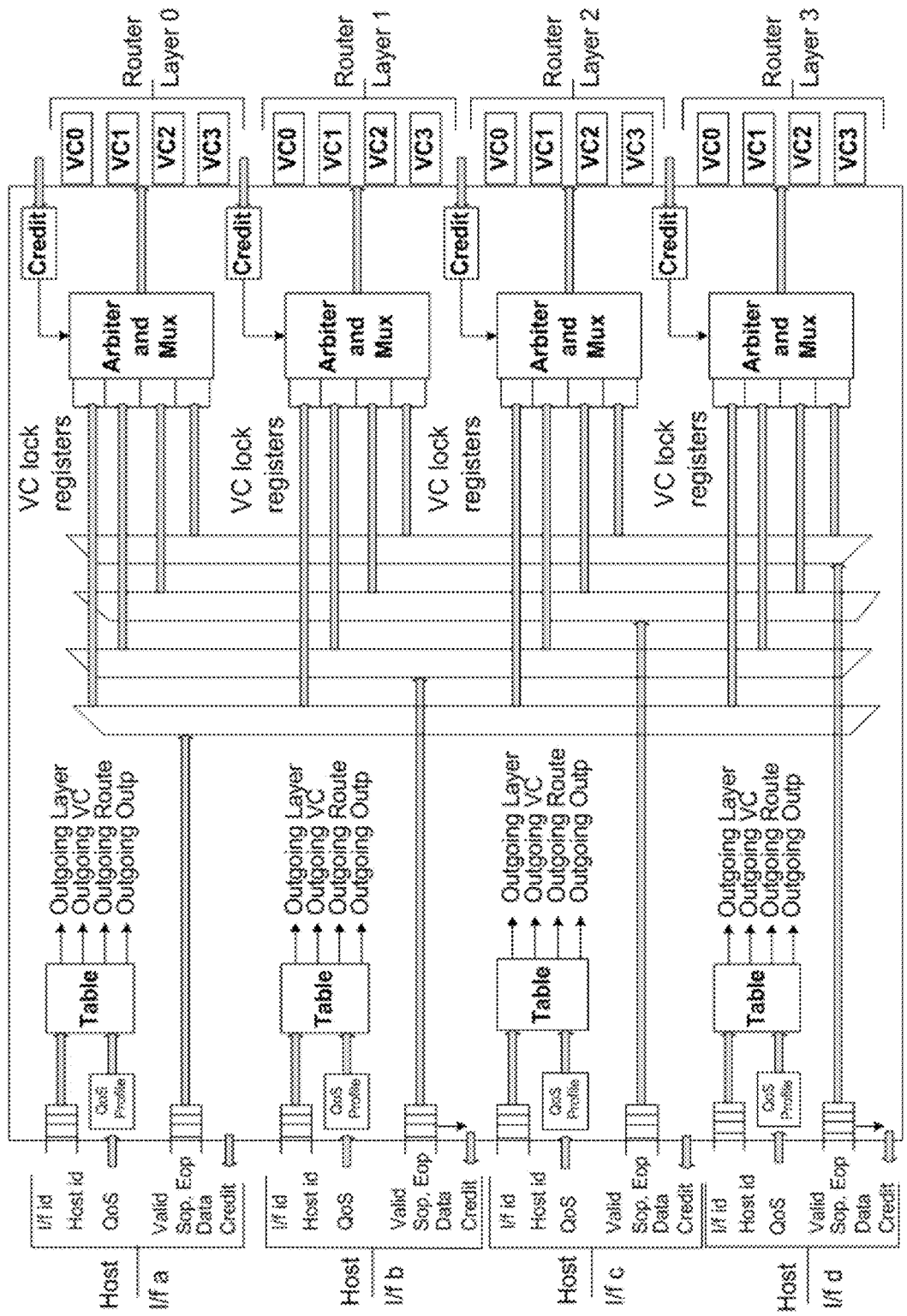
FIG. 10 illustrates block diagram of a streaming TX bridge in accordance with an example implementation.

FIG. 10 illustrates a block diagram of a streaming TX bridge in accordance with an example implementation. As illustrated, transaction packets from one or more host TX interfaces can be sent onward to the streaming TX bridge. In an example implementation, transaction signals from the Host TX interface may be routed to an optional FIFO, wherein the FIFOs can be opted out for a flow through the streaming TX bridge. Streaming TX bridge can support any number of Host TX interfaces with SOP, EOP, Data, Data Valid, Credit information and N number of NoC router layers, with each router layer including multiple varied or same number of virtual channels (VCs) with individual credit information along with SOP, EOP, payload data, and data valid. In an example implementation, streaming TX bridge, after receiving transaction messages from one or more host TX interfaces, can first perform a lookup in a plurality of corresponding tables based on the transaction properties such as source host port id, source interface id, destination host port id, destination host interface id, and Quality of Service (QoS) that are received from the respective host TX interfaces. Lookup may be fully indexed or may be fully associative table lookup and can be fully parameterized. These table may be indexed based on transaction properties such as source interface id, destination host port id, destination host interface id, and QoS, among other such attributes, wherein the lookup into the one or more tables can result into forwarding information such as, but not limited to, outgoing router layer, VC, and routing information, which can be passed on by the streaming TX bridge onward to the NoC router layers. In an example implementation, the streaming TX bridge may examine the header information that has been received from the transaction messages and forward such header information to another SOC interconnect in case the route encoded by the header dictates such forwarding. Furthermore, in case a packet does not belong to a TX bridge, i.e., there is no entry in the lookup table, the packet can be forwarded to some other default/defined interface or dropped. Alternatively, a routing table/lookup table or similar data structure may be used to route the NOC message over to the interconnected SOC depending upon the destination address of the message. Tables for lookup can also be programmed based on the traffic profile of the SoC.

FIG. 10 further illustrates how the forwarding information along with the transaction packet can be de-multiplexed to one or more router layer interfaces. In an example implementation, host arbitration can be done at each router layer inside the streaming TX bridge to allow the router layer to lock the VC that it would be using for transmission of the transaction message till the time an EOP field in a flit is received. Such host arbitration can be done based on one or more of when the request is received, whether the credits are available for the egress router layer, whether another host is already locked to the interface, among other criteria and parameters. During the arbitration process, whichever host (specifying its VC) wins the arbitration, its respective beat is forwarded to that router layer. In an example implementation, multiple host interfaces can also be locked to different VCs of the same router layer.

In an example implementation, when the incoming data width is smaller than outgoing data width, data accumulation is also done at router interface inside the streaming TX bridge. Such accumulation of data can help optimally use the bandwidth of the router layers. In another example implementation, forwarding information along with the transaction packets can also be multiplexed before they are moved onto one or more router layers. As illustrated, in another example implementation, arbitration and multiplexing actions can also be performed together in a single interconnected architecture. In another example implementation, streaming TX bridge of the present application can also provide for different host interface to layer/VC data width ratios.

Figure 11:
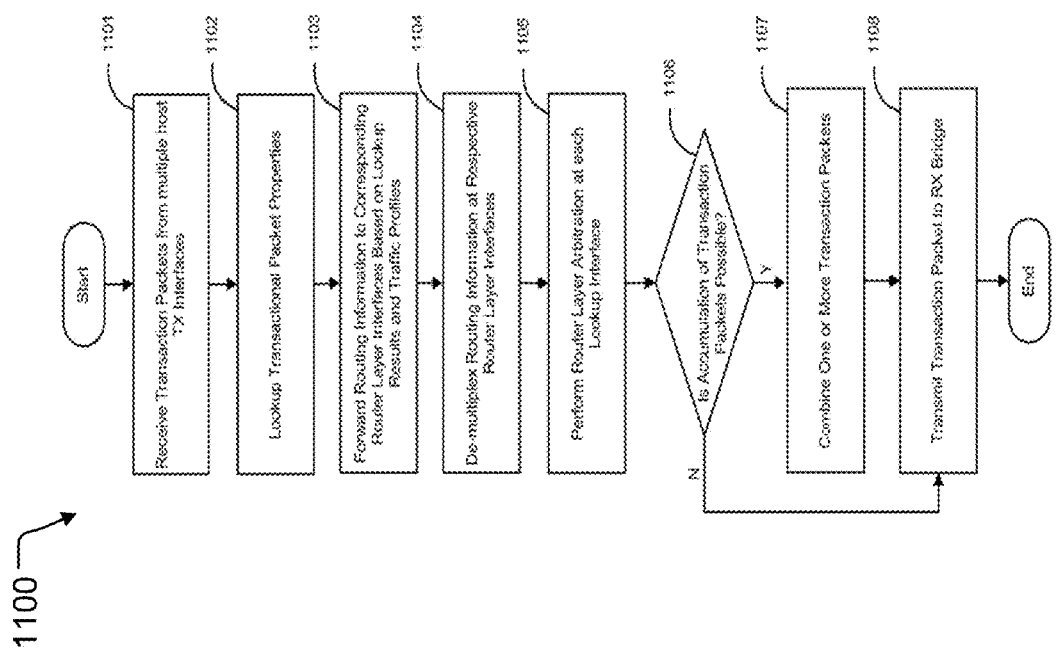
FIG. 11 illustrates a flow diagram showing transmission of transaction packets through streaming TX bridge in accordance with an example implementation.

FIG. 11 illustrates a flow diagram 1100 showing transmission of transaction packets through the streaming TX bridge in accordance with an example implementation. At 1101, one or more host TX interfaces send packet(s) to the streaming TX bridge along with transaction information such as source host port id, source interface id, destination host port id, destination host interface id, SOP, EOP, and Quality of Service (QoS), among other information through one or more injection ports at an ingress side. Information from the host TX interface(s) can be routed to an optional FIFO, as FIFO memory structures can allow on-chip usage through routing for a better performance. A bridge TX interface can be operably coupled to the on-chip communication network and can provide for communication of data over at least one physical communication channel that links the integrated circuit to at least one other integrated circuit. The bridge interface can be configured to support efficient data configuration and error correction of data communicated over the at least one physical communication channel by a sequence of processing blocks that provide generation of a data word that includes data supplied to the stream bridge interface over the on-chip communication network, generation of an error correcting word for correcting errors in the scrambled data word, and output of data frames for communication over the at least one physical communication channel over NoC.

At 1102, the streaming TX bridge can perform a lookup in one or more tables based on transactional packet properties that are received from respective host TX interfaces to generate forwarding information for the packet messages. At 1103, the generated forwarding information may be sent to the corresponding router layer interfaces based on the traffic profile of each transaction packet. Forwarding information can also be multiplexed before being forwarded onto the router layer interfaces.

At 1104, the received forwarding information, also interchangeably referred to routing information, may be de-multiplexed at respective router layer interfaces. It would be appreciated that multiplexing is an optional step and can also be avoided if desired. In an example implementation, layer information arbitration and multiplexing of transaction packets can be performed based on transaction properties such as source host port id, source interface id, destination host port id, destination host interface id, QoS, among other defined and configurable properties.

At 1105, router layer arbitration can be performed at each router layer interface, wherein the streaming TX bridge can perform a host level arbitration based on received transaction message transmission required. Host level arbitration can involve a static host selection, wherein a suitable host that carries appropriate information to communicate to a particular routing layer on NoC medium is selected.

At 1106, it is determined, based on router layers and bandwidth parameters thereof, as to whether accumulation of transaction packets is possible to optimally use the transmission of packets over the one or more VCs of the respective router layer. At 1107, when accumulation of packets is possible, one or more transactions may be combined, wherein at 1108, when accumulation of packets is not possible based on router layer parameters, the packets are transmitted individually through the selected set of router layers onto the streaming RX bridge.

Figure 12:
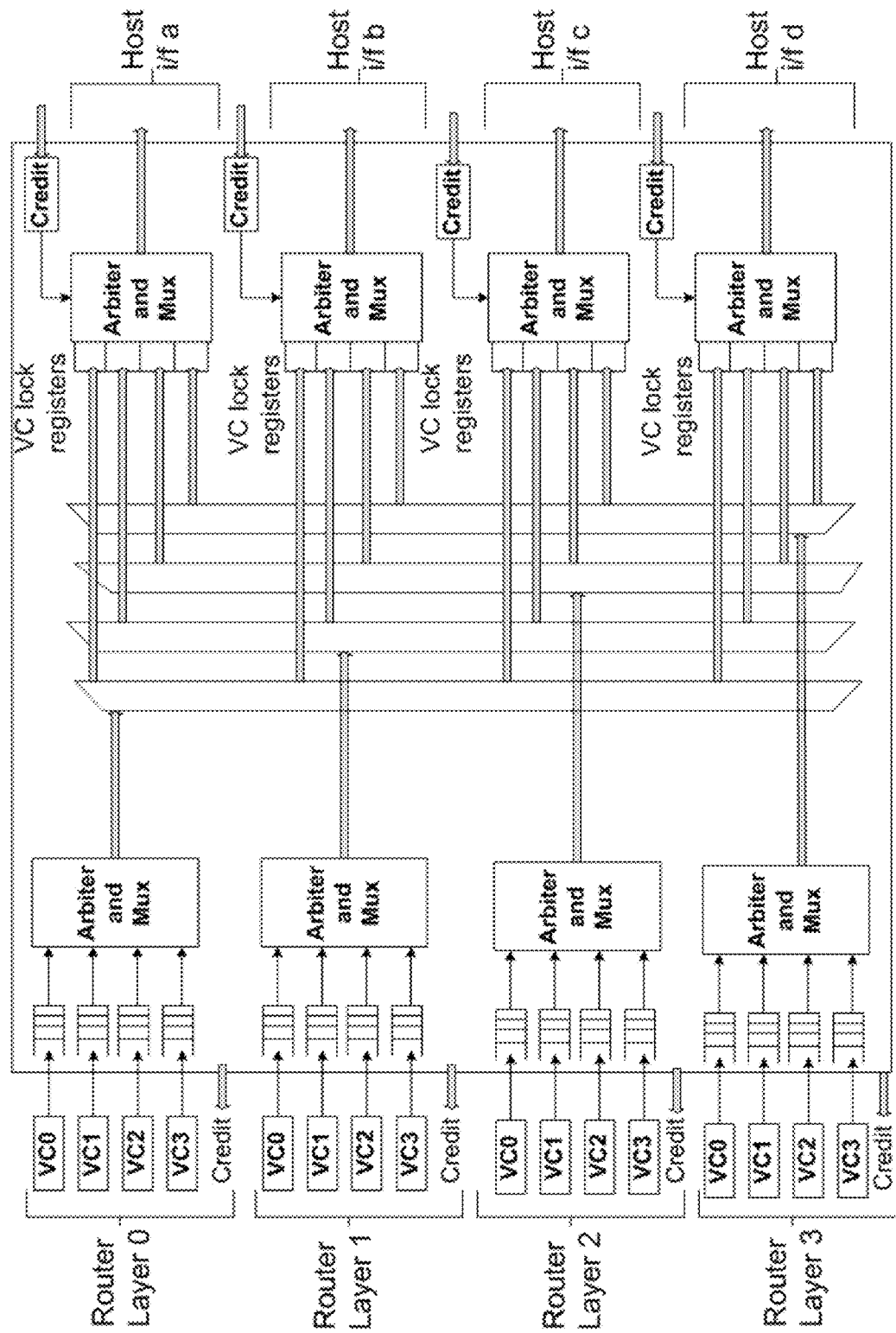
FIG. 12 illustrates a block diagram of a streaming RX bridge in accordance with an example implementation.

FIG. 12 illustrates a block diagram of a streaming RX bridge in accordance with an example implementation. In an example implementation, signals from the router layer interface may be routed to an optional FIFO. These FIFOs can be allocated per VC or can optionally be allocated for the whole layer. Such FIFOs can be opted out for a flow through streaming RX bridge. Once the streaming RX bridge receives data beats/flits from the router layers, the VCs on which the transaction packets are received can go through VC arbitration, wherein the arbitration can be conducted based on parameters such as priority/QoS, when the request was received, whether the credits are available for the egress Host RX interface, and whether another VC is already locked to the interface, or any combination of the above. During the arbitration, the respective forwarding information is de-multiplexed to all host interface logic of the streaming RX bridge for whichever VC wins the arbitration. This host interface logic of the streaming RX bridge may then conduct a layer level arbitration keeping priority and layer/VC locking information into account and accordingly forward the transaction to host RX interface. In an example implementation, the streaming RX bridge and the one or more host RX interfaces can follow the above described credit based transaction flow. In another example implementation, VC level arbitration and layer level arbitration can be combined together in single piece of logic, wherein first the VC level arbitration takes place to select the appropriate VC whose packets are to be sent to the host RX interfaces and then layer level arbitration takes place to select the router layer from which the packets are to be forwarded to the respective host RX interfaces. In an example implementation, streaming RX bridge of the present application can also be configured to perform priority arbitration based on Quality of Service (QoS). In another example implementation, configurable streaming TX bridge can also be configured to support any router layer/VC to any host interface data width ratio.

According to one example embodiment, streaming RX bridge can be configured to manipulate size and other parameters of the received data in order to enable the data to suit the host RX interface attributes. For instance, streaming RX bridge can downsize the data received from the router layers in case the received flits are wider than the host RX interface. Such downsizing can take place across multiple cycles and can be provided as a complete packet to the host RX interface.

Figure 13:
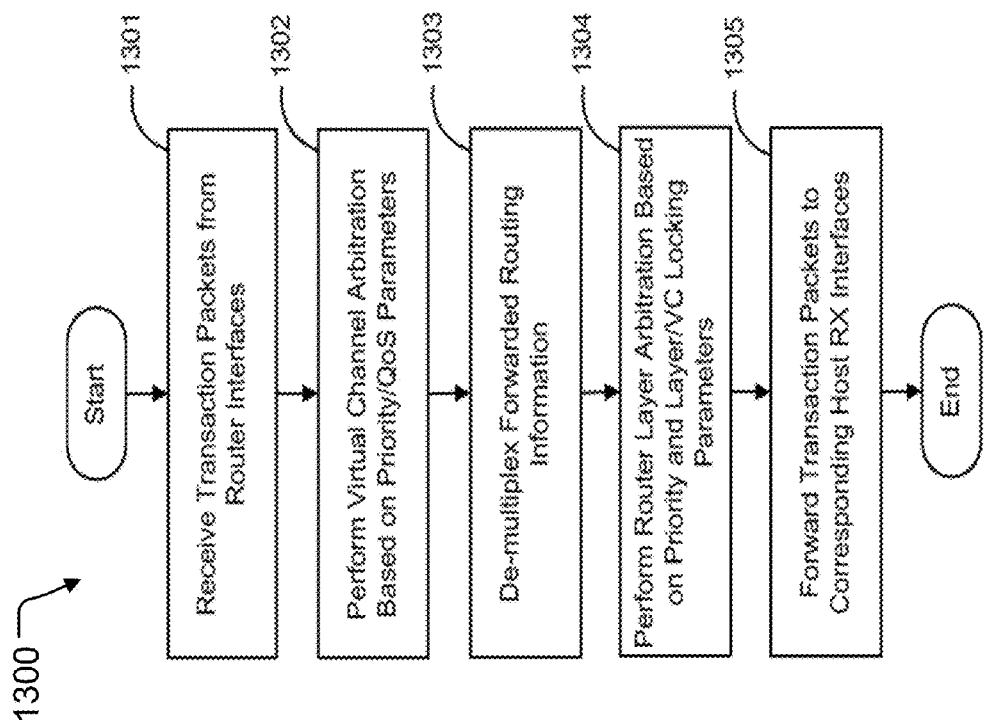
FIG. 13 illustrates a flow diagram showing processing of received transaction packets through streaming RX bridge in accordance with an example implementation.

FIG. 13 illustrates a flow diagram 1300 showing processing of received transaction packets through streaming RX bridge, in accordance with an example implementation. At 1301, signals or packet information from the router layers are routed to an optional FIFO into the streaming RX bridge. The FIFOs can be allocated per virtual channel or can optionally be allocated for the whole router layer. Information entered in these FIFOs can represent messages/information that can be received from the NoC or can represent transmitted credits. At 1302, VC arbitration is performed by the streaming RX bridge to select one or more VC layers, whose packets are to be processed based on priority and Quality of Service (QoS) attributes.

At 1303, information forwarded by the router layers is de-multiplexed. Along with the forwarding information from the NoC router layers, any other information including transaction packets, which may have been aggregated or multiplexed can also be processed at 1303 to help identify the routing information, destination host interface information, among other parameters.

At 1304, a layer level arbitration can be performed between the winning VCs of different layers to identify the router layer of which transaction packets can be forwarded to appropriate host RX interfaces. On the basis of layer level arbitration, transaction messages from the winning router layer(s) can be transmitted by the streaming RX bridge to the host RX at 1305.

Figure 14:
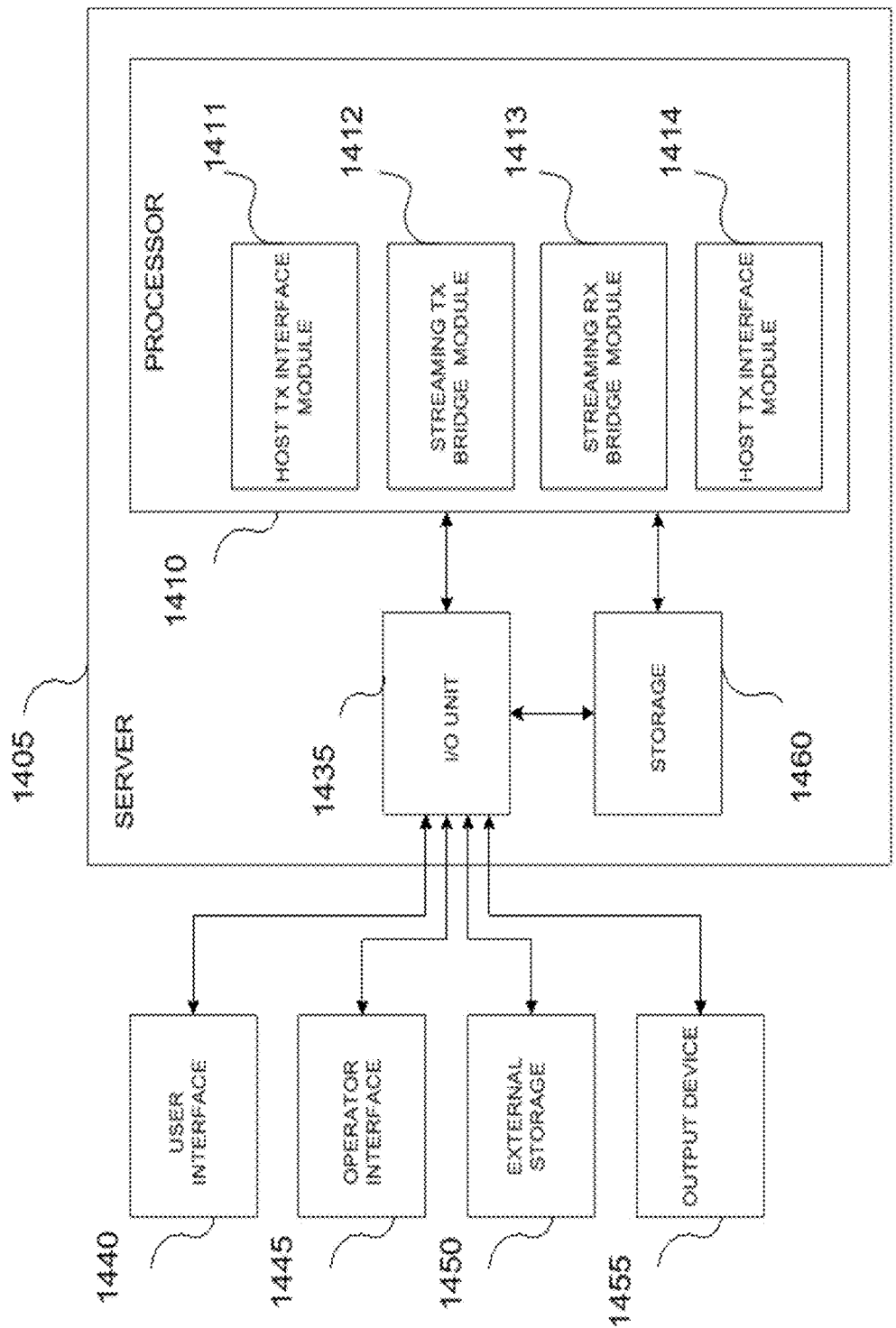
FIG. 14 illustrates a computer/server block diagram upon which the example implementations described herein may be implemented.

FIG. 14 illustrates an example computer system 1400 on which example implementations may be implemented. The computer system 1400 includes a server 1405 which may involve an I/O unit 1435, storage 1460, and a processor 1410 operable to execute one or more units as known to one of skill in the art. The term "computer-readable medium" as used herein refers to any medium that participates in providing instructions to processor 1410 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include media such as carrier waves. The I/O unit processes input from user interfaces 1440 and operator interfaces 1445 which may utilize input devices such as a keyboard, mouse, touch device, or verbal command.

The server 1405 may also be connected to an external storage 1450, which can contain removable storage such as a portable hard drive, optical media (CD or DVD), disk media or any other medium from which a computer can read executable code. The server may also be connected an output device 1455, such as a display to output data and other information to a user, as well as request additional information from a user. The connections from the server 1305 to the user interface 1440, the operator interface 1445, the external storage 1450, and the output device 1455 may via wireless protocols, such as the 802.11 standards, Bluetooth® or cellular protocols, or via physical transmission media, such as cables or fiber optics. The output device 1455 may therefore further act as an input device for interacting with a user.

The processor 1410 may execute one or more modules including a host TX interface module 1411, a streaming TX bridge module 1412, a streaming RX bridge module 1413, and a host RX interface module 1414. In one example implementation, the host TX interface module 1411 can be configured to send, via one or more host TX interfaces, transaction messages or traffic information over the NoC interconnect to one or more host RX interfaces. Each transaction message may include a header flit that has routing information including valid bit indicator, destination port identifier, destination interface identifier, and virtual channel identifier, among other traffic parameters and preferences, which can be used for selection of NoC router layers on the NoC interconnect. Host TX interface module 1411 may therefore be configured to send input signal and interface with the streaming TX bridge module 1412 through at least one injection port at the ingress side.

In an example implementation, the streaming TX bridge module 1412 can be configured to support one or more host TX interfaces on one side and operatively coupled with multiple NoC router layers on the other side. The streaming TX bridge module 1412 can further be configured to perform unidirectional or bidirectional communication channels and provide a simple interface to the host TX interfaces to send and transfer packets irrespective of the host protocol to the host RX interfaces through the router layers by means of multiplexing the generated forwarded information after table look up and arbitrating for the VCs and the NoC router layers. The streaming TX bridge module 1412 can further be configured to perform routing task for the received message over the NoC interconnect, which involves determining a path over the NoC for the given received message and perform lookup based on the transaction properties received from the transaction packets including the source host port id, source interface id, destination host port id, destination host interface id, and the QoS, which may result in generation of forwarding information along with packet, which can then help identify the outgoing router layer, VC, and routing information.

In another example implementation, the streaming RX bridge module 1413 can be configured to receive transaction packets along with forwarding information from the NoC router layers and process the packets to send them to the respective host RX interfaces. The module 1413 can be configured to implement single or multiple levels of arbitration including a VC level arbitration to identify the VC of whose messages need to be given higher priority. The module 1413 can further be configured to de-multiplex the forwarding information to obtain the actual routing information. Streaming RX bridge module 1413 can still be configured to implement a layer level arbitration, wherein from among the winning VCs of different router layers, one or more layers are selected based on traffic, QoS, priority, among other parameters for onward transmission to the host RX interfaces. In an example implementation, credits are used as a mechanism for transferring beats from the streaming RX bridge to the host RX interfaces.

In another example implementation, the host TX interface module 1414 can be configured to operatively couple one or more host RX interfaces with the streaming RX bridge. Host TX interface module 1414 can further be configured to receive transaction packets from the streaming RX bridge to the one or more host RX interfaces.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method for transacting data from a source host to a destination host through a Network on Chip (NoC) interconnect, the method comprising:
   receiving, at a streaming TX bridge connecting the source host to one or more routers of the NoC interconnect, one or more transaction packets and one or more traffic profiles from a plurality of source host interfaces;
   processing the one or more transaction packets at the streaming TX bridge based on the one or more traffic profiles to identify routing details for the one or more transaction packets;
   transmitting the one or more transaction packets based on the routing details; and
   receiving, at a streaming RX bridge connecting the destination host to one or more routers of the NoC interconnect, the one or more transaction packets for onward transmission to a plurality of destination host interfaces of the destination host.

2. The method of claim 1, wherein the one or more traffic profiles are defined based on at least one of a start-of-packet indicator, a destination host indicator, a destination interface indicator, an end-of-packet indicator, a data indicator, a data valid indicator, a Quality of Service (QoS) parameter, and credit information.

3. The method of claim 1, wherein the routing details comprise one or more router layers, one or more virtual channels (VC's), and routing information, wherein the streaming TX is configured to support the one or more router layers and the one or more virtual channels.

4. The method of claim 1, wherein the one or more traffic profiles are processed by the streaming TX bridge based on lookup information to generate forwarding information, wherein the routing details for the one or more transaction packets are determined based on the forwarding information.

5. The method of claim 4, wherein the lookup information comprises one or more of a fully indexed table and an associative table lookup, and wherein the lookup information is parameterized.

6. The method of claim 4, wherein the lookup information comprises information indexed based on traffic profile, wherein each of the one or more traffic profiles further comprises one or more of: a transaction property, a source interface identifier, a destination host port identifier, a destination host interface identifier, and Quality of Service (QoS).

7. The method of claim 1, further comprising conducting arbitration of the data at the streaming TX bridge.

8. The method of claim 1, wherein one or more host interfaces are locked to different VCs within a layer.

9. The method of claim 1, further comprising configuring a cell size of the streaming TX bridge.

10. The method of claim 1, further comprising providing, at the streaming TX bridge, a dynamically defined host interface to Layer/VC data width ratio.

11. The method of claim 1, further comprising downsizing, at the streaming RX bridge, the one or more transaction packets received from NoC interconnected before transmitting the one or more transaction packets to destination host interfaces.

12. A system configured to transact data from a source host to a destination host through a Network on Chip (NoC) interconnect, the system comprising:
 a processor coupled to a streaming TX bridge and a streaming RX bridge, the processor configured to:
 receive, at the streaming TX bridge connecting the source host to one or more routers of the NoC interconnect, one or more transaction packets and one or more traffic profiles from a plurality of source host interfaces;
 process the one or more transaction packets at the streaming TX bridge based on the one or more traffic profiles to identify routing details for the one or more transaction packets;
 transmit the one or more transaction packets based on the routing details; and
 receive, at the streaming RX bridge connecting the destination host to one or more routers of the NoC interconnect, the one or more transaction packets for onward transmission to a plurality of destination host interfaces of the destination host.

13. The system of claim 12, wherein the one or more traffic profiles are defined based on at least one of a start-of-packet indicator, a destination host indicator, a destination interface indicator, an end-of-packet indicator, a data indicator, a data valid indicator, a Quality of Service (QoS) parameter, and credit information.

14. The system of claim 12, wherein the routing details comprise one or more router layers, one or more virtual channels (VC's), and routing information, wherein the streaming TX is configured to support the one or more router layers and the one or more virtual channels.

15. The system of claim 12, wherein the one or more traffic profiles are processed by the streaming TX bridge based on lookup information to generate forwarding information, wherein the routing details for the one or more transaction packets are determined based on the forwarding information.

16. The system of claim 15, wherein the lookup information comprises one or more of a fully indexed table and an associative table lookup, and wherein the lookup information is parameterized.

17. The system of claim 15, wherein the lookup information comprises information indexed based on traffic profile, wherein each of the one or more traffic profiles further comprises one or more of: a transaction property, a source interface identifier, a destination host port identifier, a destination host interface identifier, and Quality of Service (QoS).

18. The system of claim 12, wherein the processor is further configured to conduct arbitration of the data at the streaming TX bridge.

19. The system of claim 12, wherein one or more host interfaces are locked to different VCs within a layer.

20. The system of claim 12, further comprising configuring a cell size of the streaming TX bridge.

* * * * *